United States Patent [19]

Miyazaki et al.

[11] 4,170,718
[45] Oct. 9, 1979

[54] IMMEDIATE RING-BACK CONTROL SYSTEM FOR TIME-DIVISION TELEPHONE EXCHANGE

[76] Inventors: Katsuyuki Miyazaki, 2000, Kamikuratacho, Totsuka-ku, Yokohama; Akira Horiki, 4338, Kamariyacho, Kanazawa-ku, Yokohama, both of Japan

[21] Appl. No.: 865,710

[22] Filed: Dec. 29, 1977

[30] Foreign Application Priority Data

Jun. 8, 1977 [JP] Japan .................................. 52-66697

[51] Int. Cl.² ............................................... H04J 3/12
[52] U.S. Cl. ........................... 179/15 BY; 179/18 HB; 179/84 R
[58] Field of Search ............ 179/18 HB, 84 R, 15 BY Primary Examiner—Thomas A. Robinson
Attorney, Agent, or Firm—Gregory J. Nelson

[57] ABSTRACT

An immediate ring-back control system in a time-division telephone exchange comprising a time-division switching network of an incoming time switch-space switch-outgoing time switch (T-S-T) system. A continuous ring-back tone is supplied to a plurality of successive addresses of the incoming time switch and an interrupted ring-back tone is supplied to at least one address thereof. Upon connection of the ring-back tone, a first address number of the successive addresses supplied with the continuous ring-back tone is written into a control memory corresponding to the time switch while the successive addresses are sequentially increased for each count of a timing pulse generated periodically. The content of the control memory is modified by the address number successively increased and the successive address numbers are modified to the address number to which the interrupted ring-back tone is supplied, thereby to reduce a post dialling delay.

4 Claims, 4 Drawing Figures

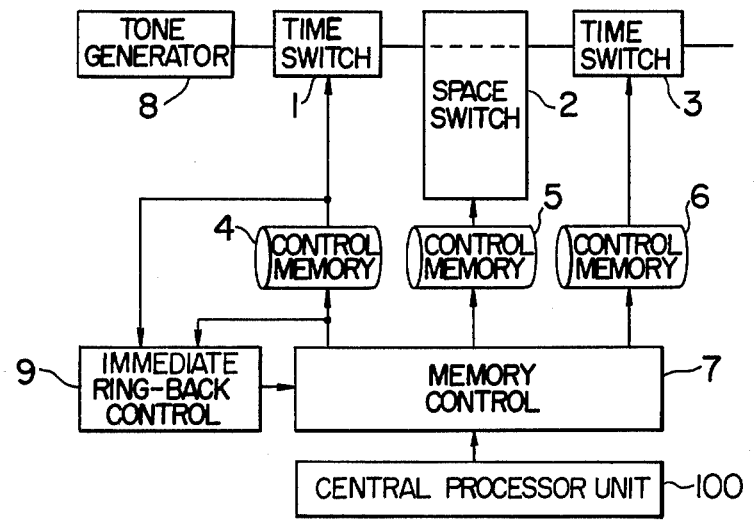
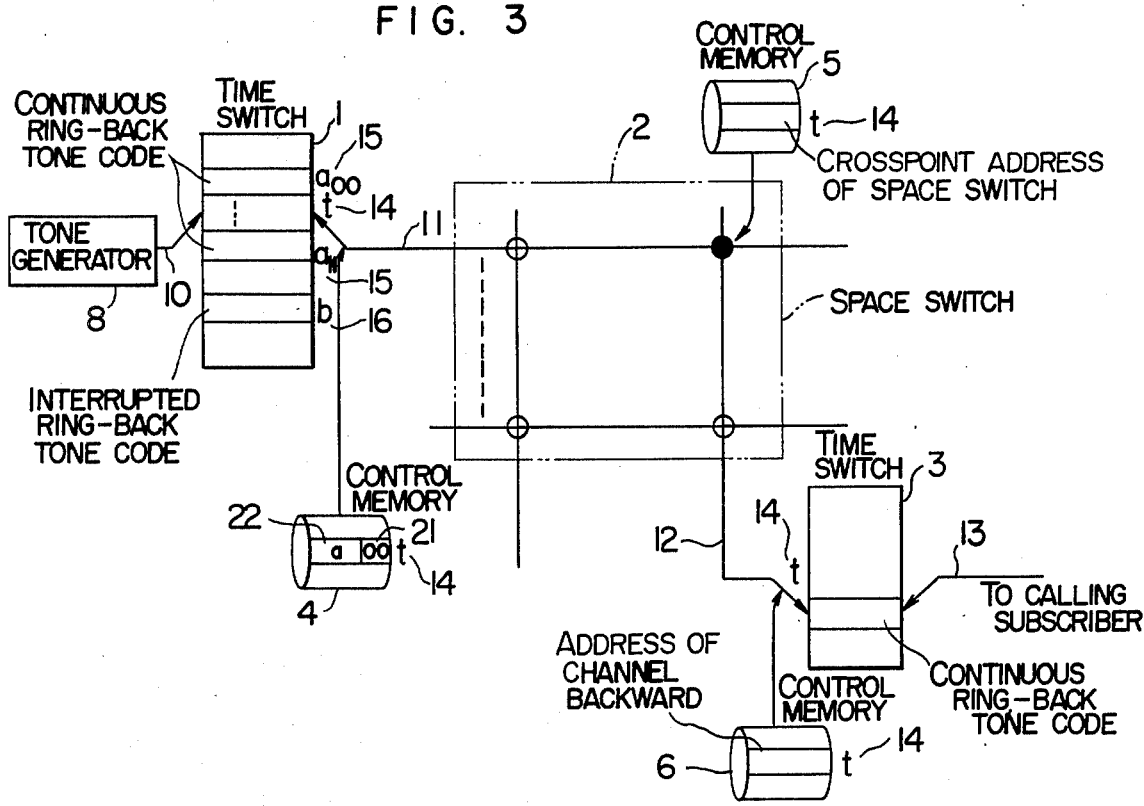

IMMEDIATE RING-BACK CONTROL SYSTEM FOR TIME-DIVISION TELEPHONE EXCHANGE

BACKGROUND OF THE INVENTION

The following references are illustrative of the present state of the art in time-division telephone exchanges:

1. The Japanese literature entitled "H-type Automatic Telephone Switching System", pp. 157-158, chap. 4.1.3;
2. The Japanese Patent Publication No. 16971/66;
3. Bell Laboratories Record, Vol. 51, No. 8, pp. 226-232, September 1973 entitled "No. 4 ESS-Long Distance Switching for the Future" written by Mr. G. Douglas Johnson; and
4. International Switching Symposium 74, pp. 212/1-212/5 entitled "An Experimental Digital Local System" written by Mr. H. S. McDonald.

The present invention relates generally to time-division telephone exchanges and, more particularly, to an immediate ring-back control system for a time-division telephone exchange, which first sends a continuous ring-back tone to a calling subscriber for a given time period and then sends a periodically interrupted ring-back tone at the time of connection of the ring-back tone to the calling subscriber in order to allow the calling subscriber to receive the ring-back tone immediately after the calling subscriber has dialled a called telephone number.

It is desirable to shorten the period of time required when a calling subscriber has dialled a telephone number, a speech path to a called subscriber has been established and the ring-back tone is received by the calling subscriber, that is, to reduce post dialling delay. The post dialling delay includes, in addition to the period of time for establishing the speech path, a delay time from the beginning of ready state of calling the called subscriber in a terminating office to the time of the actual transmission of the ring-back tone to the calling subscriber. This delay time has a significant influence on the telephone service. For example, in the case where the ring-back tone is intermittently sent to the calling subscriber with a one-second mark and a two-second space, there exists an instance where a maximum of two-seconds delay time is required before the ring-back tone is sent to the calling subscriber.

In order to reduce such a delay time to improve the serviceability, a first ringing control system has been heretofore used, in which a continuous ringing signal is sent to the called subscriber once for a predetermined period of time after the establishment of the speech path and the continuous ring-back tone is sent to the calling subscriber, and thereafter a periodically interrupted ring-back signal and ring-back tone are sent. However, in such a case, since this prior art first ringing control system requires a first ringing control circuit for each of the ring-back tone trunk circuits, it has a drawback in that the cost of the ring-back tone trunk circuits is high.

SUMMARY OF THE INVENTION

It is an object of the present invention to provide an economical immediate ring-back control system which improves serviceability by providing in a time-division telephone exchange an immediate ring-back control circuit which may be constructed by a simple circuit utilizing the characteristics of the time-division telephone exchange.

The features of the time-division telephone exchange are to be capable of branch connection of a single information source to a number of channels, capable of economically attaining a large theoretical lattice, and capable of centrally accommodating audible signal tones including the ring-back tone in a single highway. Those features can be achieved by the utilization of the time switch.

According to the present invention, there is provided an immediate ring-back control circuit as a time-division multiplex common circuit in the time-division telephone exchange of the type described above. A tone generator, which generates various digitalized audible signal tones in a time-multiplexed fashion, supplies a continuous ring-back tone to a plurality of successive addresses of an incoming time switch which is a part of a T-S-T system time-division switch (i.e. a time-space-time system), and also supplies a periodically interrupted ring-back tone to at least one address. Upon establishment of a time-division speech path from a calling subscriber to the tone generator, the channel selection for a first address of the successive addresses supplied with the continuous ring-back tone is carried out, and the first address number is written into an address of a control memory corresponding to the time switch (i.e. a time slot allotted by channel matching). On the other hand, in the immediate ring-back control circuit, for each count of a periodically generated timing pulse, the successive address numbers are sequentially increased, and the content of the control memory is updated by the increased address numbers so that the continuous ring-back tone is sent for a given period of time corresponding to a period of time required to update the successive address number with use of the first address number to the last address number or a predetermined address number. Then, the last or predetermined number in the successive address numbers is updated by the address number to which the interrupted ring-back tone is supplied. In this manner, the post dialling delay can be shortened in an economical way.

BRIEF DESCRIPTION OF THE DRAWINGS

FIG. 1 shows a block diagram of one embodiment of a time-division telephone exchange to which the present invention is applied.

FIG. 2 shows an example of the format of a control memory for an initial stage time switch.

FIG. 3 shows a schematic diagram for illustrating a speech path and the operation of the control memory.

DETAILED DESCRIPTION OF THE PREFERRED EMBODIMENTS

Figure 4:
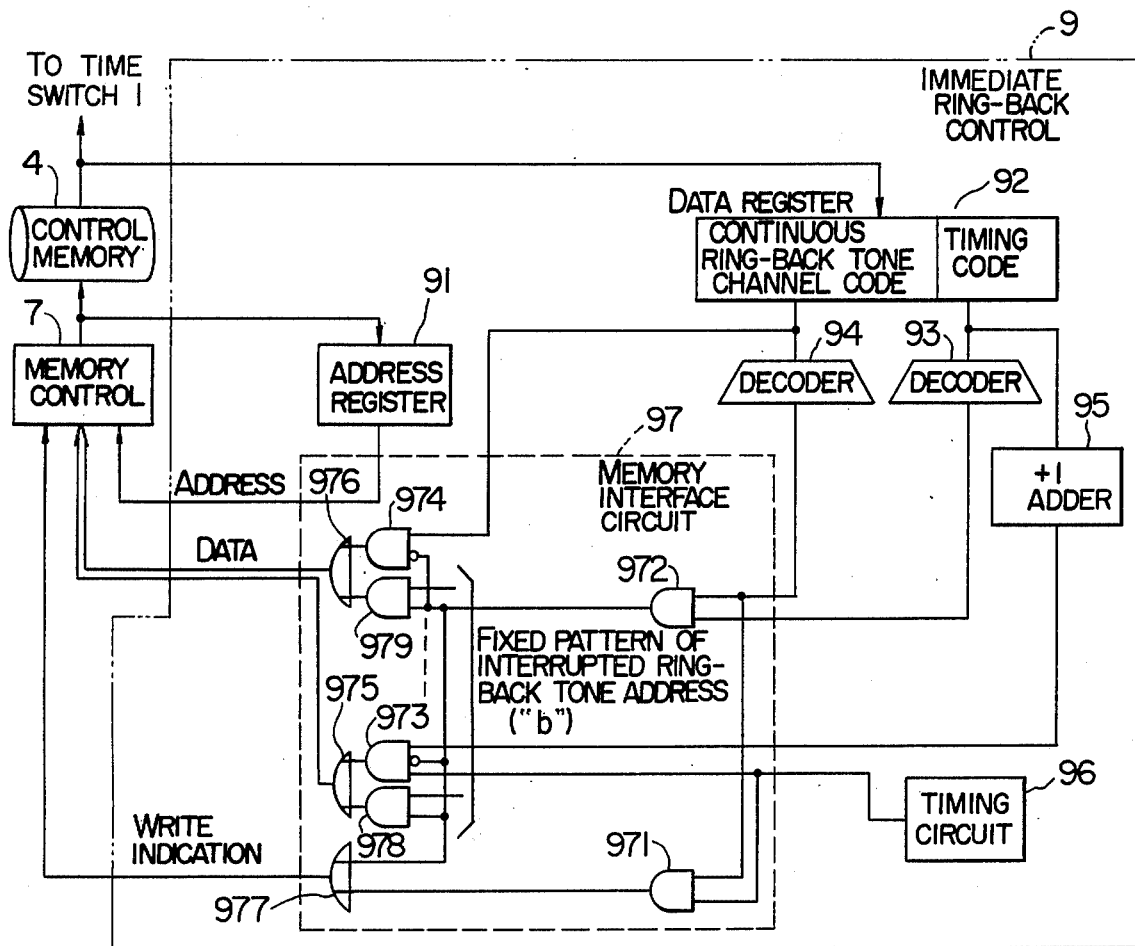
FIG. 4 shows a block diagram of one embodiment of an immediate ring-back control circuit of the present invention.

Referring to the drawings, the preferred embodiments of the present invention are explained below.

FIG. 1 shows a block diagram of an embodiment of a time-division telephone exchange to which the present invention is applied, showing only that portion which relates to sending of the ring-back tone. Referring to FIG. 1, numerals 1 and 3 denote, respectively, incoming and outgoing time switches. These switches 1 and 3 are also known as a channel shift switch forward and a channel shift switch backward, respectively, and they serve to perform time switching or to interchange time slots by a buffer memory which cyclically stores and updates the content of memory for each sampling period. A plurality of such time switches 1 and 3 are provided in accordance with the capacity of the telephone exchange. Numeral 2 denotes a space switch or a highway switch which performs space switching in each of the time slots. Accordingly, switches 1, 2 and 3 form a time-space-time (T-S-T) system time-division switching network. Numerals 4, 5 and 6 denote control memories which are correspondingly provided for controlling the time switch 1, the space switch 2 and the time switch 3, respectively. Memories 4 through 6 also are referred to as channel shift memory forward, highway switch memory and channel shift memory backward, respectively. Numeral 7 denotes a memory control circuit for updating the control memories 4 to 6 by instructions from a central processor unit (CPU) 100. Numeral 8 denotes a tone generator associated with an input stage of any one of a plurality of incoming time switches 1 for generating various digitalized audible signal tones including the continuous ring-back tone and the interrupted ring-back tone. The continuous ring-back tone code is supplied to each of a plurality of successive addresses of a time switch 1 to which the tone generator 8 is coupled, and the interrupted ring-back tone code is supplied to at least one address of the time switch 1.

The digital tone generator can be readily realized by known digital techniques (e.g. see a technical report disclosed in International Switching Symposium 74, pp. 212/1–212/5, entitled "An Experimental Digital Local System").

Numeral 9 denotes an immediate ring-back control circuit which is provided for the control memory 4 for controlling the incoming time switch 1 associated with the tone generator 8, and, accordingly, it is the circuit by which the present invention is characterized.

FIG. 2 shows an example of the format of a memory address for the continuous ring-back tone channel bits in the control memory 4 in the case of supplying the continuous ring-back tone to the incoming time switch 1. In FIG. 2, a memory area 21 functions as timing bits for periodically monitoring a sending time for the continuous ring-back tone. Since two low order bits are allotted, it can monitor three stages at maximum. A memory area 22 represents a predetermined address on the continuous ring-back tone code of the incoming time switch 1, and six high order bits are allotted thereto. Accordingly, a total of those eight bits represent one of four successive addresses in accordance with the particular stage of the sending time for the continuous ring-back tone code in the time switch 1.

FIG. 3 shows a schematic diagram for illustrating a speech path and the operation of the various control memories to show the flow of the continuous ring-back tone and the interrupted ring-back tone. In FIG. 3, numeral 10 denotes an incoming highway from the tone generator 8 to the incoming time switch 1, numeral 11 denotes an outgoing highway from the time switch 1 to the space switch 2, numeral 12 denotes an incoming highway from the space switch 2 to the outgoing time switch 3, numeral 13 denotes an outgoing highway from the time switch 3 to a calling subscriber, and t (numeral 14) denotes a vacant time slot which is common to the outgoing highway 11 and the incoming highway 12 and selected by the channel matching operation of the central processor unit. Numeral 15 denotes an address of the incoming time switch 1 at which the continuous ring-back tone code generated by the tone generator 8 is stored, and numeral 16 denotes an address of the time switch 1 at which the interrupted ring-back tone code is stored. The various tone codes generated by the tone generator 8 are previously assigned with predetermined addresses of the time switch 1 at which they are to be stored, and those tone codes are cyclically supplied to the corresponding addresses in each sampling period. For example, the continuous ring-back tone code may be supplied to four successive addresses "$a_{00}$" to "$a_{11}$" ("a" represents a six-bit binary number), and the interrupted ring-back tone code may be supplied to address b ("b" represents an eight-bit binary number).

When the ring-back tone is to be sent to a calling subscriber, the central processor unit 100 performs channel matching inside the time-division switch in a per se known manner and updates the contents of the address of the control memories 4 to 6 through the memory control 7 in accordance with the result of channel matching. In that case, the least address number at which the continuous ring-back tone is supplied, is written into the control memory 4, so that the read address of the incoming time switch 1 is specified. That is, "00" is written into the memory area 21 of the control memory 4 while "a" is written into the memory area 22. The continuous ring-back tone code readout of the incoming time switch 1 at time slot t (14) is sent to the calling subscriber via the space switch 2 and the outgoing time switch 3, as shown in FIG. 3.

The general principle of setting the time-division switching network is the same well-known principle as discussed in the article "No. 4 ESS-Long Distance Switching for the Future"; Bell Laboratories Records, Vol. 51, No. 8, pp. 226–232, September 1973.

A prime feature of the present invention resides in the immediate ring-back control circuit 9 which controls the sending of the ring-back tone such that the continuous ring-back tone is sent to the calling subscriber for a given period of time after which the interrupted ring-back tone is sent. The immediate ring-back control circuit 9 is associated with the control memory 4 corresponding to the incoming time switch 1 which stores the tone codes, and it is constructed as shown in FIG. 4.

In FIG. 4, numeral 91 denotes an address register which latches an address when the memory control 7 reads out the contents of control memory 4 sequentially, numeral 92 denotes a data register which reads out and latches the address contents of the control memory 4 which have been sequentially read out, numeral 94 denotes a decoder which decodes the portion of the data register 92 which corresponds to the memory area 22 of the control memory 4 to determine whether the continuous ring-back tone is being sent or not, and numeral 93 denotes a decoder, like the decoder 94, which decodes the portion of the data register 92 which corresponds to the memory area 21 of the control memory 4 to determine whether that portion indicates the 1st number or a predetermined number of the successive address numbers for the continuous ring-back tone. Numeral 95 denotes a +1 adder for successively increasing by one the portion of the data register 92, which corresponds to the memory area 21 of the control memory 4. Numeral 96 denotes a timing circuit for generating a timing pulse at predetermined time intervals (e.g. at 0.5 second time intervals in the following explanation) regardless of the contents of the data register 92 in order to successively increase by one the memory area 21 of the control memory 4 at predetermined time intervals. Numeral 97 denotes a memory interface circuit which activates the memory control 7 such that when the decoder 94 indicates that the continuous ring-back tone is being sent, the content of the control memory 4 is updated by the successive address numbers ($a_{01}$–$a_{11}$) for the continuous ring-back tone on the time switch 1, which are sequentially provided from the +1 adder 95 for each timing pulse generated by the timing circuit 96, and when the decoder 93 indicates the last address of the continuous ring-back tone, the content of the control memory 4 is updated by the address number (b) for the interrupted ring-back tone.

The operation of the embodiment of the present invention will now be explained. When the ring-back tone is to be sent to a calling subscriber, an idle time slot t (14) which is common to the control memories 4 to 6 is allotted to the calling subscriber by the central processor unit 100 in accordance with the result of channel matching. The first address number "$a_{00}$" of the plurality of successive address numbers supplied with continuous ring-back tone is then stored in the address of the control memory 4 which corresponds to the time slot t (14) while the gating information or crosspoint address of the space switch 2 is stored in the control memory 5. Similarly, the address of the outgoing time switch 3 which is allotted to the calling subscriber is stored in the control memory 6. The sequential read addresses of the control memory 4 are always set to the address register 91 from the memory control 7, and the contents read out of the control memory 4 are always set to the data register 92.

The addresses of the incoming time switch 1 supplied with the continuous ring-back tone code may be, for example, four addresses $a_{00}$–$a_{11}$ in the present embodiment. Let it be assumed that the continuous ring-back tone is sent for a total of 0.5 seconds as a minimum to 1 second as a maximum such that the "$a_{00}$" address for the continuous ring-back tone code is sent during the first time intervals (0.5 second) of the timing pulse from the timing circuit 96, the "$a_{01}$" address for the continuous ring-back tone code is sent during the next interval, the "$a_{10}$" address for the continuous ring-back tone code is sent during the next interval, and so on. In this case, the "$a_{10}$" address is the predetermined address as referred to in the present invention, and it is also the last address of the successive addresses. The "$a_{11}$" address is not actually used and it is an invalid address.

At the beginning of sending the continuous ring-back tone to the calling subscriber, the content which is read out of the control memory 4 at the time slot t (14) allotted to the calling subscriber and latched in the data register 92, is the first address "$a_{00}$" of the plural successive addresses of the incoming time switch 1 to which the continuous ring-back tone is supplied. The continuous ring-back tone channel code portion of the content is "a" indicating the state that the continuous ring-back tone is being sent, and the timing code portion of the content is "00" indicating the state that the first one of the timing pulses of predetermined time intervals (0.5 seconds) generated by the timing circuit 96 has not been received after the start of sending the continuous ring-back tone. As a result, the output of the decoder 94 turns out to be "ON" but an output of an AND gate 971 does not turn out to be ON unless the timing pulse is supplied from the timing circuit 96. Accordingly, the memory interface circuit 97 does not have access to the memory control 7. During the next time slot (t+1), the content (information) of another subscriber is read out of the control memory 4 and other connection is made or the immediate ring-back control circuit 9 carries out the immediate ring-back control operation to the other subscriber. In repeating the above operation, the timing circuit 96 generates the timing pulse at 0.5 second intervals. Those pulses are held for a period of time during which the control memory 4 completes one revolution to all of the time slots. During that period of time, since an AND gate 973 is opened by the timing pulse, the content of the calling subscriber in question is read out of the control memory 4 at the time slot t (14) and the content of the timing code portion of the data register 92 is successively increased by one by the +1 adder 95. Accordingly, "01" is applied through the AND gate 973 to an OR gate 975. Since an output of an AND gate 972 turns out to be "OFF" because the output of the decoder 93 is not "ON", the content "a" of the continuous ring-back channel code portion of the data register 92 is applied to the memory control circuit 7 through an AND gate 974 and an OR gate 976. A "WRITE-IN" request which is produced by an AND gate 971 producing the logical product of the output of the decoder 94 and the output of the timing circuit 96, is applied to the memory control 7 through an OR gate 977. Accordingly, the memory content of the address of the control memory 4 specified by the content latched in the address register by the memory control 7, that is, at the address t is updated to "$a_{01}$". The above operation is repeated thereafter so that the content of the control memory 4 is not altered until another 0.5 second has elapsed, and the continuous ring-back tone is continuously sent to the calling subscriber. When the 0.5 second period has elapsed, the same operation as that of the 0.5 second increment described above is repeated so that only the memory area 21 is successively increased by one to be "10" and the memory content of the control memory 4 is altered to the third address "$a_{10}$" to which the continuous ring-back tone of the incoming time switch 1 is supplied. After the memory content has been updated, the control memory 4 is sequentially read out. When the content of the third address is read out, the timing code portion of the data register 92 is changed to "10", which corresponds to the predetermined last address number of the successive addresses indicating that the continuous ring-back tone has been sent to the calling subscriber for 0.5 to 1 second. Accordingly, the output of the decoder 93 turns out to be "ON". Since the output of the decoder 94 has already been "ON", the AND gate 972 turned out to be "ON". As a result, the "WRITE-IN" request is applied to the memory control 7 through an OR gate 977, and since AND gates 978 and 979 are "ON", the fixed data at the address "b" of the time switch 1 to which the interrupted ring-back tone is supplied, is applied to the memory control 7 through OR gates 975 and 976. As a result, the memory control 7 interchanges the content at the address (t) of the control memory 4 to the address "b" of the time switch 1 or the content to instruct the sending of the interrupted ring-back tone from the time switch 1. Thereafter, since the content of the data register 92 does not indicate the state that the continuous ring-back tone is being sent, the output of the decoder does not turns out to be "ON" and the outputs of the AND gates 971 and 972 do not turn out to be "ON". Accordingly, no access is given to the memory control 7. Thus, the interrupted ring-back tone is sent to the calling subscriber until the called subscriber responds. As seen from the above explanation, the immediate ring-back control circuit 9 can operate in a time-division multiplex manner to the traffic which the control memory 4 can handle. Since the incoming time switch 1 which the tone generator 8 is associated with can be connected to all of a plurality of the outgoing time switches 3 or an individual time switch 3 through the space switch 2, the immediate ring-back control circuit 9 is a common circuit for all of the subscribers.

As described hereinabove, according to the present invention, it is no longer necessary to provide the immediate ring-back control circuit in each trunk circuit as has been necessary in the prior art system, since the common immediate ring-back control circuit of the present invention requires only a small amount of hardware. As a result, the calling subscriber can receive the ring-back tone immediately after the completion of dialling, in an economic way. Thus, the present invention can contribute to the improvement of the serviceability of telephone.

We claim:
1. In a time-division telephone exchange comprising:
a time-division switching network of an incoming time switch-space switch-outgoing time switch system, said switching network including a plurality of incoming time switches and a plurality of outgoing time switches;
a plurality of control memories, each of which is associated with one of said incoming and outgoing time switches, for controlling the same; and
a memory control circuit for controlling a plurality of said control memories, said memory control circuit being controlled by a central processor unit of a stored program type;
the improvement further comprising an immediate ring-back control system comprising:
(a) a tone generator for supplying a continuous ring-back tone code to a plurality of successive addresses of at least one of said incoming time switches and an interrupted ring-back tone code to at least one other address of said incoming time switch; and
(b) an immediate ring-back control circuit responsive to said memory control circuit and controlling the incoming time switch which is associated with said tone generator, comprising:
a timing circuit for generating timing pulses at predetermined time intervals;
a circuit coupled to said memory control circuit and said timing circuit and receiving a first address number of said successive addresses of said incoming time switch to which the continuous ring-back tone stored in response to said central processor unit at addresses of said control memory is supplied upon connection of said ring-back tone, and sequentially updating said first address number by a next address number of said successive addresses to which said continuous ring-back tone code is supplied, and finally updating the last address number of said successive addresses by the other address of said incoming time switch to which said interrupted ring-back tone is supplied so that,
upon the connection of the ring-back tone, the continuous ring-back tone is sent to a calling subscriber for a period of time corresponding to a predetermined number of timing pulses, after which period of time said interrupted ring-back tone is sent to said calling subscriber.

2. An immediate ring-back control system according to claim 1, wherein the memory content of the addresses corresponding to the connection of the continuous ring-back tone of the control memory corresponding to the incoming time switch which the tone generator is associated with is divided into higher order bits indicating a continuous ring-back tone address and lower order bits indicating an elapsed time of transmission of the continuous ring-back tone, and the memory content indicative of said transmission time is increased by said immediate ring-back control circuit in accordance with the elapsed time of the transmission of the continuous ring-back tone, and the addresses for the continuous ring-back tone of the incoming time switch which is associated with said tone generator are sequentially updated by said memory content.

3. An immediate ring-back control system according to claim 1, wherein said timing circuit is adapted to periodically generate a timing pulse which is maintained for one operation cycle of said incoming time switch for determining an elapsed step of the transmission time of the continuous ring-back tone, and said immediate ring-back control circuit includes an address register for latching the address when said control memory control circuit sequentially reads out the content of the control memory with which said immediate ring-back control circuit is associated, a data register for latching the content of the control memory sequentially read out, a first decoder for determining whether a predetermined higher order bit of the data received by said data register includes the continuous ring-back tone address, a second decoder for determining whether the address number of the successive addresses of said incoming time switch to which said continuous ring-back tone is supplied has reached the last address number of said successive addresses, by a predetermined lower order bit of the data received by said data register, a +1 adder circuit for successively increasing said successive address numbers of said data register by one step, and an interface circuit for activating said memory control circuit when the output of said first decoder is "ON" and said timing circuit produces the timing pulse to cause said memory control circuit to update the content of said control memory by the address data of said incoming time switch to which said continuous ring-back tone is supplied, said address data being the sum of a predetermined lower order bit of the continuous ring-back tone address derived from said +1 adder circuit and a predetermined higher order bit of said data register, and activating said control memory control circuit when the outputs of said first and second decoders are "ON" to cause said memory control circuit to update the address of said control memory by the fixed data of the address of the time switch to which said interrupted ring-back tone is supplied.

4. An immediate ring-back control circuit according to claim 3, wherein said interface circuit includes means for requesting a write operation to the memory control circuit by providing the logical product of the output of said first decoder and the timing pulse of said timing circuit and also providing the logical product of the outputs of said first and second decoders, means for transferring, to the memory control circuit, as write data to the control memory, the content of the continuous ring-back tone address field of said data register and the output of said +1 adder circuit when the timing pulse is produced if the AND condition of the outputs of said first and second decoders is not met, means for transferring to the memory control circuit, as the write data to the control memory, the fixed data of the interrupted ring-back tone address when the AND condition of the outputs of said first and second decoders is met, and means for transferring the output of said address register to said memory control circuit.

* * * * *

UNITED STATES PATENT AND TRADEMARK OFFICE
CERTIFICATE OF CORRECTION

PATENT NO. : 4,170,718
DATED : October 9, 1979
INVENTOR(S) : Katsuyuki Miyazaki and Akira Horiki It is certified that error appears in the above-identified patent and that said Letters Patent are hereby corrected as shown below:

The front page of the patent should indicate the following:

"Assignee: Hitachi, Ltd., Japan"

Signed and Sealed this

Fifteenth Day of July 1980

[SEAL]

Attest:

SIDNEY A. DIAMOND

Attesting Officer — Commissioner of Patents and Trademarks